United States Patent
Taft et al.

(10) Patent No.: US 11,582,589 B2
(45) Date of Patent: Feb. 14, 2023

(54) WIRELESS NETWORK POLICY MANAGER FOR A SERVICE MESH

(71) Applicant: Verizon Patent and Licensing Inc., Basking Ridge, NJ (US)

(72) Inventors: David Taft, Keller, TX (US); Vinod Kumar Choyi, Conshohocken, PA (US); Maqbool Chauhan, Keller, TX (US); Jerry Steben, Fort Worth, TX (US); Parry Cornell Booker, Arlington, TX (US); Hossein M. Ahmadi, Parsippany, NJ (US); Minbao Li, Lewisville, TX (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 239 days.

(21) Appl. No.: 16/899,150

(22) Filed: Jun. 11, 2020

(65) Prior Publication Data

US 2021/0392477 A1 Dec. 16, 2021

(51) Int. Cl.
| | |
|---|---|
| *H04L 29/06* | (2006.01) |
| *G06F 21/00* | (2013.01) |
| *H04W 4/20* | (2018.01) |
| *H04L 9/40* | (2022.01) |
| *H04W 12/37* | (2021.01) |
| *H04L 67/56* | (2022.01) |
| *H04W 84/18* | (2009.01) |

(52) U.S. Cl.
CPC ............... *H04W 4/20* (2013.01); *H04L 63/14* (2013.01); *H04L 67/56* (2022.05); *H04W 12/37* (2021.01); *H04W 84/18* (2013.01)

(58) Field of Classification Search
CPC ....... H04W 4/20; H04W 12/37; H04W 84/18; H04W 12/009; H04W 12/121; H04L 63/14; H04L 67/28; H04L 67/2819; H04L 63/20; H04L 63/1408
See application file for complete search history.

(56) References Cited

U.S. PATENT DOCUMENTS 11,271,699 B1 * 3/2022 Eyuboglu ............ H04J 11/0079
2020/0358802 A1 * 11/2020 Viswambharan ..... H04L 63/105
(Continued)

OTHER PUBLICATIONS

Istio 1.6: Security. Accessed online Jun. 11, 2020 https://istio.io/latest/docs/concepts/security/. 24 pages.

*Primary Examiner* — Lisa C Lewis

(57) ABSTRACT

A computer device may include a memory storing instructions and processor configured to execute the instructions to host a network function container that implements a microservice for a network function in a wireless communications network, wherein the network function container is deployed by a container orchestration platform; host a service proxy container associated with the network function container, wherein the service proxy container is deployed by the container orchestration platform; and configure the hosted service proxy container to apply a wireless network policy to the microservice for the network function. The processor may be further configured to intercept messages associated with the microservice for the network function using the configured service proxy container; and apply the wireless network policy to the intercepted messages using the configured service proxy container.

20 Claims, 11 Drawing Sheets

(56) References Cited

U.S. PATENT DOCUMENTS

2020/0366697 A1* 11/2020 Vittal ................... G06F 9/468
2021/0135983 A1*  5/2021 Farnham ............... H04L 45/306
2021/0240540 A1*  8/2021 Wang ................. G06F 9/44505
2022/0060894 A1*  2/2022 Pazhyannur .......... H04W 12/08

* cited by examiner

WIRELESS NETWORK POLICY MANAGER FOR A SERVICE MESH

BACKGROUND INFORMATION

To satisfy the needs and demands of users of mobile communication devices, providers of wireless communication services continue to improve and expand available services as well as networks used to deliver such services. One aspect of such improvements includes the virtualization of the components of wireless communications networks. A wireless communications network may provide different types of services to a large number of devices under various types of conditions. Managing virtualized components to service a large number of different services or handle a large number of different conditions poses various challenges.

DETAILED DESCRIPTION OF PREFERRED EMBODIMENTS

Figure 1:
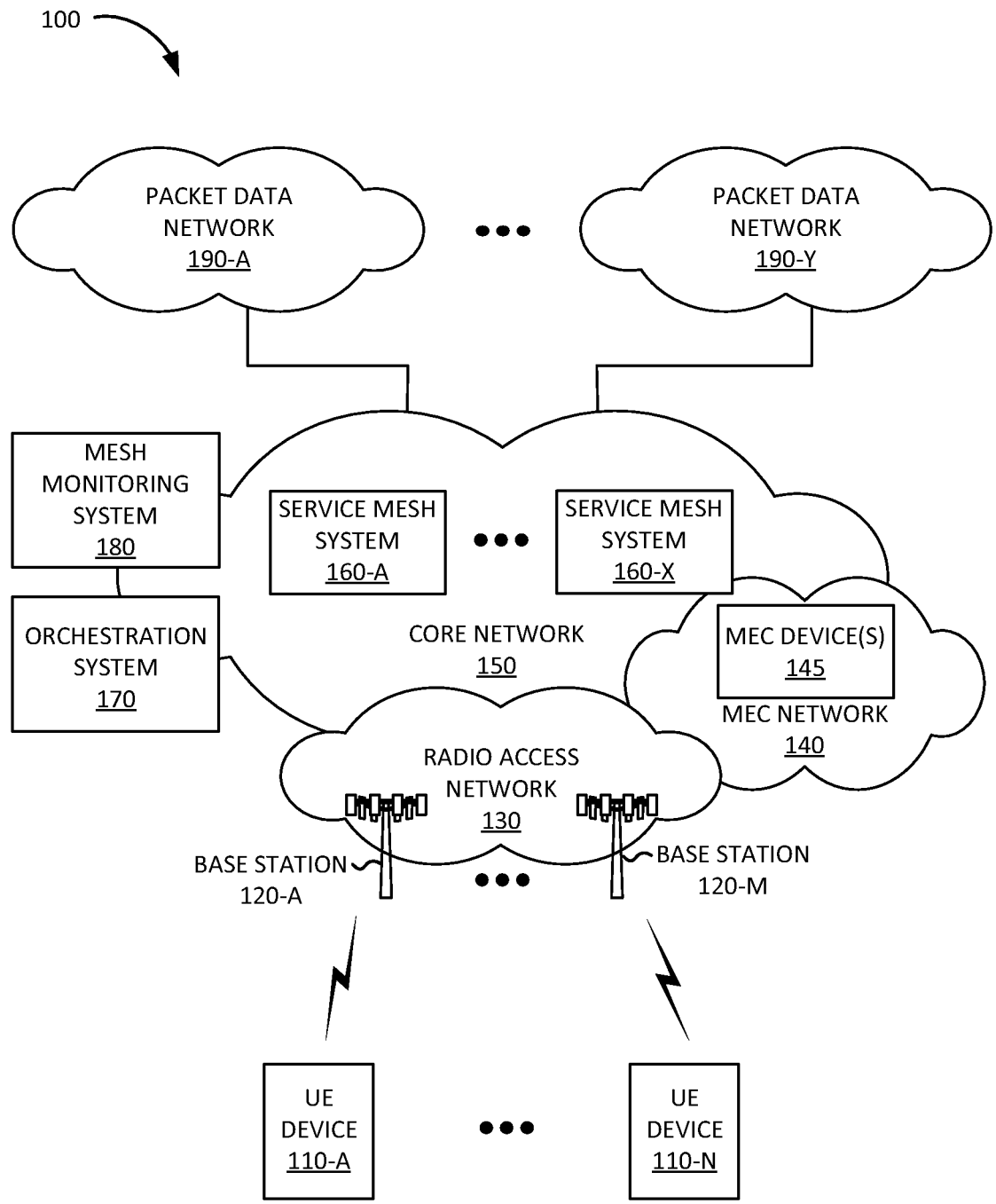
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technology. Additionally, a 5G core network supports and manages 5G radio access networks (RAN) that include base stations, providing various services and enabling connections to other networks (e.g., connections to the Internet, etc.). As an example, a 5G core network may provide support for enhanced Mobile Broadband (eMBB), ultra reliable low latency communication (URLLC), massive Machine Type Communication (mMTC), and/or other types of communications.

Such different types of services may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Class of Service (CoS) class, and/or particular enterprise customer associated with a set of UE devices.

In order to implement functionality such as, for example, network slicing, a 5G core network may include various network nodes, known as network functions (NFs). As the number of different NF types and deployed instances of each NF continues to increase, the use of virtualized NFs (VNFs) has become more prevalent. VNF representations of network devices and/or nodes may be implemented using, for example, a European Telecommunications Standards Institute (ETSI) network function virtualization (NFV) management and organization (MANO) architecture and may be referred to as VNF managed objects (VNF MOs). VNF MOs may be deployed, for example, on hardware in a cloud computing center. In contrast to specialized hardware, which may be costly, time-consuming to deploy, difficult to scale, and/or labor-intensive to manage, NFV may enable network entities to be implemented on standardized hardware, resulting in lower deployment and/or maintenance costs, as well as bring higher flexibility compared to dedicated hardware implementations. For example, a VNF may be implemented on a hardware component that is part of a common shared physical infrastructure used to implement VNF instances using Software Defined Networking (SDN) or another type of virtualization technique. The common shared physical infrastructure may be implemented using computer devices in a cloud computing center, a multi-access edge computing (MEC) system associated with a base station, and/or in another type of computer system.

Virtualization has traditionally been implemented using virtual machines. Virtual machines are generated on a physical architecture using a virtual machine monitor, also referred to as a hypervisor. Each virtual machine runs its own instance of an operating system (OS), libraries, and binary executable files. However, because each virtual machine includes a separate instance of an operating system, deploying new virtual machines is costly in terms of memory and processing power, adds complexity to a software development cycle, and limits the portability of applications implemented using virtual machines between different types of physical architectures.

In order to address these issues, container-based virtualization technology has been developed. Container-based virtualization, sometimes referred to as OS-level virtualization, enables multiple isolated user space instances to use the same OS instance and/or kernel space. The isolated user space instances are referred to as containers. A container may have its own set of libraries and binary executable files, and/or its own dedicated share of hardware resources, but may share a kernel space with other containers. Since containers are decoupled from the underlying infrastructure, containers may be portable across cloud center and OS distributions. Furthermore, the functions of an NF may be divided into microservices implemented in different containers. An NF deployed using containers may be referred to as a Cloud-Native Function (CNF).

To facilitate the creation, configuration, and/or deployment of containers, a container orchestration platform may be used to configure and automate NF deployment, scaling, and/or management. For example, the container orchestration platform may deploy additional instances of an NF based on increased load and may manage the deployed instances across different physical devices, referred to as nodes. The container orchestration platform may organize containers into groups called pods. A pod may guarantee that containers in the pod are collocated in the same node. Examples of container orchestration platforms include Kubernetes (k8s), Docker Swarm, Amazon Elastic Container Service (ECS), Helios, Apache Mesos, Red Hat Open Shift Container Platform, Cloudify, etc.

When a large number of containers are deployed, communication between the microservices provided by the containers may become complex. A container orchestration platform may not provide the necessary infrastructure for such communication. A service mesh system may be deployed to provide an infrastructure layer to enable communication between container-based microservices. Examples of service mesh systems include Istio, Consul, Kuma, Linkerd, Maesh, Grey Matter, etc.

However, communication between NF microservices may be associated with additional requirements. For example, NFs in a core network may need to satisfy requirements set by various policies, such as, for example, relating to CoS requirements, mobility management requirements, network slicing requirements, etc. A service mesh system may not be able to guarantee that such requirements are satisfied.

Implementations described herein relate to a wireless network policy manager for a service mesh. The wireless network policy manager may enable wireless communication network NFs implemented using a service mesh to function properly to satisfy service requirements and/or other types of policies required by the wireless communication network. A service mesh system may be configured to include a wireless network policy manager that applies policies, associated with a RAN and/or the core network associated with the RAN, to an NF instance implemented in a service mesh. A service mesh system, which includes the wireless network policy manager, may be configured to generate, implement, and/or host a network function container, which hosts a microservice for a network function in a wireless communications network, and a service proxy container associated with the network function container. The network function container and the service proxy container may be deployed by a container orchestration system in the same pod in a node of a group of nodes that are part of a service mesh managed by the service mesh system. The network function container may implement a microservice associated with a 5G NF, a Fourth Generation (4G) Evolved Packet Core (EPC) node, and/or another type of network function node.

The wireless network policy manager may configure the service proxy container to apply a wireless network policy to the microservice for the network function. The service proxy container may then intercept messages and/or data associated with the microservice for the network function and apply the wireless network policy to the intercepted messages using the configured service proxy container. The wireless policy may include a policy to set an attribute that is specific to the network function. Additionally, or alternatively, the wireless policy may include a of a CoS policy, a mobility management policy, a network slice policy, a security policy, a policy to collect values for a particular metric, a policy to support a particular protocol, a Self-Optimizing Network (SON) policy, or a Multi-Access Edge Computing (MEC) policy, and/or another type of policy associated with a wireless communication network.

Implementations described herein further relate to a mesh monitoring system configured to monitor multiple service meshes and to analyze data collected from the multiple service meshes to detect security threats. For example, particular security threats, which may not be detected based on data associated with a single service mesh, may be identified if data from multiple service meshes is analyzed. Different service meshes may be associated with different geographic regions, different network slices, different wireless communication networks, different providers of wireless communication services, different enterprises, etc.

The mesh monitoring system may be configured to collect values for a set of metrics from a group of service meshes, detect a security threat based on the collected values, update and/or tailor a security policy based on the detected security threat, and instruct one or more of the service meshes to apply the updated and/or tailored security policy to network functions in each corresponding service mesh. In some implementations, the mesh monitoring system may detect security threats by using a machine learning model trained to detect security threats in a wireless communications network.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), base stations 120-A to 120-X (referred to herein collectively as "base stations 120" and individually as "base station 120"), radio access network (RAN) 130, MEC network 140, MEC device(s) 145, core network 150, service mesh systems 160-A to 160-X referred to herein collectively as "service mesh systems 160" and individually as "service mesh system 160"), orchestration system 170, mesh monitoring system 180, and packet data networks (PDNs) 190-A to 190-Y (referred to herein collectively as "PDNs 190" and individually as "PDN 190").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

RAN 130 may include base station 120. Base station 120 may include a 5G NR base station (e.g., a gNodeB) and/or a 4G LTE base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.). Furthermore, base station 120 may establish an encrypted wireless communication channel with UE device 110 using session keys generated as part of the authentication process. Base stations 120 may facilitate handovers in RAN 130. For example, UE device 110 may move from a service area of a first base station 120 to the service area of a second base station 120 and a connection may be handed over from the first base station 120 to the second base station 120 in response.

MEC network 140 may include one or more MEC devices 145. MEC devices 145 may provide MEC services to UE devices 110. As an example, a MEC service may include a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, a virtual network function (VNF), and/or another type of network service. As yet another example, a MEC service may include control of IoT devices, such as hosting an application server for autonomous vehicles, a security system, a manufacturing and/or robotics system, and/or another type of IoT system. In some implementations, some or all of a service mesh system 160 may be implemented on MEC device(s) 145.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 190.

In some implementations, core network 150 may include a 5G core network. Exemplary components of a 5G core network are described below with reference to FIG. 4. In other implementations, core network 150 may include a 4G LTE core network (e.g., an evolved packet core (EPC) network). An EPC network may include devices that implement network functions that include a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 190; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

Core network 150 may include service meshes 160-A to 160-X (referred to herein collectively as "service meshes 160" and individually as "service mesh 160"). Service mesh 160 may provide an infrastructure layer for a system of container-based NFs deployed and managed using a container orchestration platform. The containers may be deployed on a network of nodes, with each node implemented on one or more computer devices. The computer devices may be part of a cloud computing center, may be implemented on MEC devices 145 in MEC network 140, and/or may be implemented using a different type of hardware architecture. Service mesh 160 may include some or all of the NFs for core network 150 to manage wireless communication services for UE devices 110.

Orchestration system 170 may include one or more computer devices, such as server devices, to orchestrate NFs in core network 150. For example, orchestration system 170 may determine whether a particular NF instance in core network 150 is to be created, deleted, and/or modified, whether a new type of NF instance needs to be added to core network 150; may manage the creation, deletion, and/or modification of network slices in core network 150; and/or may perform other types of orchestration tasks in core network 150. Orchestration system 170 may send instructions to service mesh systems 160 and/or may receive status reports from service mesh systems 160.

Mesh monitoring system 180 may include one or more computer devices, such as server devices, that monitor service mesh systems 160. Mesh monitoring system 180 may include a security threat detection engine, such as, for example, a malware detection and mitigation engine. Mesh monitoring system 180 may collect values for a set of metrics from a group of service meshes, detect a security threat based on the collected values using a machine learning model, update a security policy based on the detected security threat, and instruct service mesh systems 160 to apply the updated security policy to NFs in each corresponding service mesh.

Additionally, in some implementations, mesh monitoring system 180 may receive data from service meshes in other core networks (not shown in FIG. 1), such as service meshes associated with another network slice, other providers of wireless communication services, service meshes in other countries, etc.

PDNs 190-A to 190-N may each include a packet data network. A particular PDN 190 may be associated with an Access Point Name (APN) and a UE device may request a connection to the particular packet data network 190 using the APN. PDN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
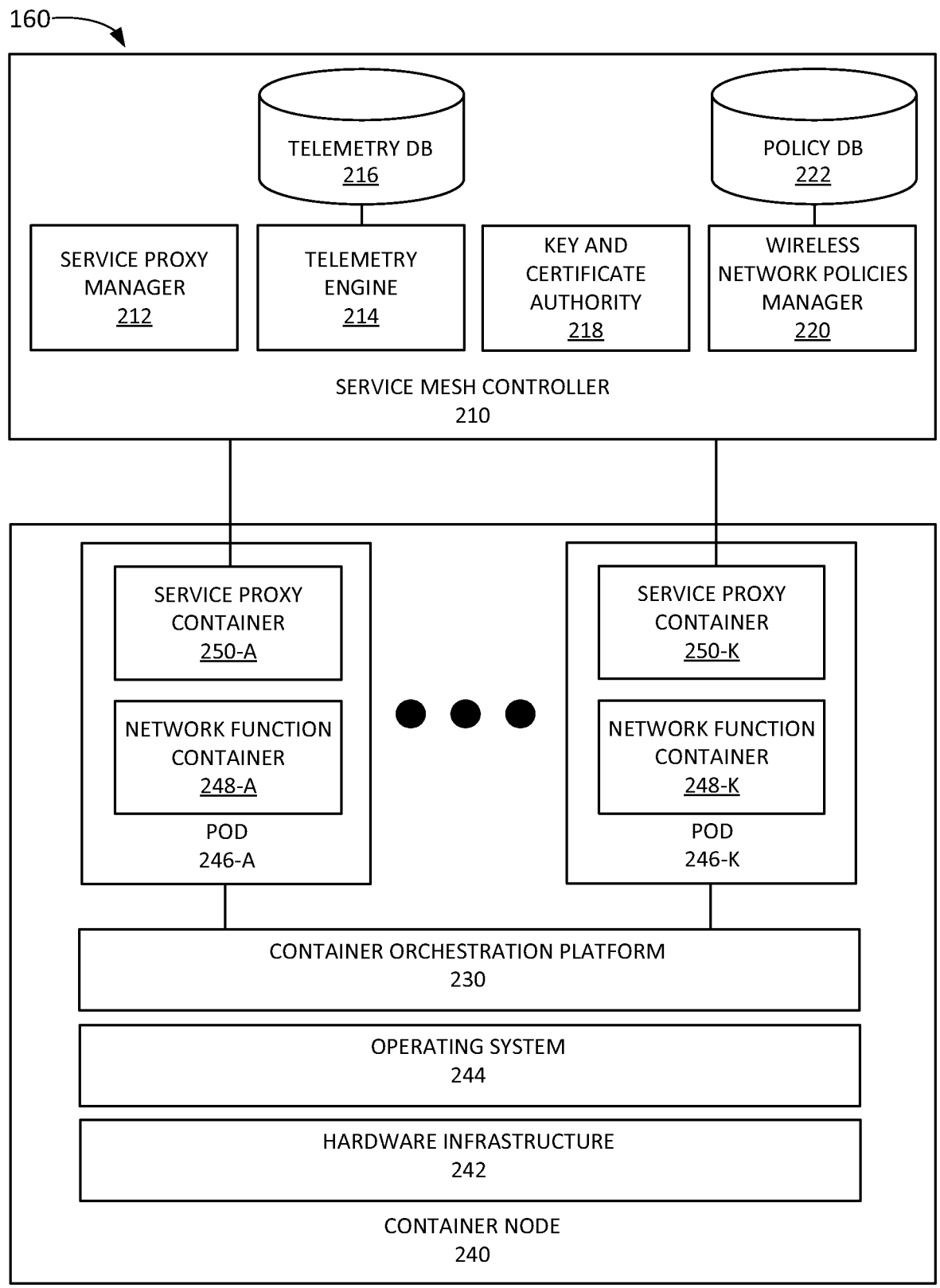
FIG. 2 illustrates exemplary components of a service mesh system of FIG. 1 according to an implementation described herein.

FIG. 2 is a diagram illustrating exemplary components of service mesh system 160. As shown in FIG. 2, service mesh system 160 may include a service mesh controller 210 and container nodes 240. While FIG. 2 depicts a single container node 240 for illustrative purposes, in practice, service mesh controller 210 would communicate with multiple container nodes 240.

Service mesh controller 210 may control the service mesh associated with service mesh system 160. Service mesh controller 210 may include a service proxy manager 212, a telemetry engine 214, a telemetry database (DB) 216, a key and certificate authority 218, a wireless network policies manager 220, and a policy DB 222.

Service proxy manager 212 may manage the connectivity in a service mesh of NF containers via a service proxy container 250 that intercepts communication between NF containers. Service proxy manager 212 may instruct container orchestration platform 230 to inject service proxy container 250 into each pod 246 and may configure service proxy container 250 for managing communications between NF containers 248. For example, service proxy manager 212 may configure load balancing, routing rules, resiliency rules, and/or other communication rules for service proxy container 250.

Telemetry engine 214 may collect telemetry data associated with NF containers in the service mesh using the service proxy and may store the collected telemetry data in telemetry DB 216. For example, telemetry engine 214 may collect metrics, also referred to as key performance indicators (KPIs), such as a transport network KPI, a wireless communication network KPI, and/or another type of KPI.

Examples of transport network KPIs may include packet loss, packet delay, load capacity, request count, request duration, request size, response size, number of Transmission Control Protocol (TCP) bytes sent and/or received, the number of TCP connections opened and/or closed, and/or other types of transport network KPIs. Examples of wireless communication network KPIs collected by telemetry engine 214 may include accessibility KPIs (e.g., a Radio Resource Control (RRC) setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless communication network KPIs.

Key and certificate authority 218 may manage keys and certificates in the service mesh. The keys and certificates may be used to establish encrypted communication channels between NF containers. Wireless network policies manager 220 may inject wireless network policies into service proxy container 250. In other implementations, wireless network policies manager 220 may instruct container orchestration platform 230 to deploy a separate service proxy container (e.g., an additional container to service proxy container 250) to apply wireless network policies. Wireless network policies manager 220 may select a particular set of policies from policy DB 222 for a particular NF container 246. Exemplary information that may be stored in policy DB 222 is described below with reference to FIG. 5.

Container node 240 may include underlying hardware infrastructure 242, an operating system 244, a container orchestration platform 230, and pods 246-A to 246-K (referred to herein collectively as "pods 246" and individually as "pod 246"). Container orchestration platform 230 may automate deployment, scaling, and/or load balancing of pods 246. A particular container node 240 may be designated and/or deployed as a master node. Container orchestration platform 230 in the master node may include an Application Programming Interface (API) server for managing worker nodes (e.g., container nodes 240) and interfacing with service mesh controller 210, a key value store to manage data associated with the group of pods 246 controlled by the master node, a controller that activates new pods as needed, and a scheduler to load balance traffic to individual pods 246. Container orchestration platform 230 may deploy additional instances of a container based on increased load and may manage the deployed instances across different container nodes 240. Container orchestration platform 230 may be implemented using Kubernetes (k8s), Docker Swarm, Amazon Elastic Container Service (ECS), Helios, Apache Mesos, Red Hat Open Shift Container Platform, Cloudify, and/or another orchestration platform.

Pod 246 may include an NF container 248 and a service proxy container 250. NF container 248 may include an instance of a microservice associated with an NF. For example, if the NF corresponds to a Network Repository Function (NRF), a first pod 246 may include an NRF registration microservice NF container 248, a second pod 246 may include an NRF subscription microservice NF container 248, and a third pod 246 may include an NRF discovery microservice NF container 248.

Service proxy container 250 may function as a service proxy for pod 250 by intercepting messages sent to NF container 248 and/or messages sent by NF container 248. Service proxy container 250 may enforce load balancing, routing, resiliency, and/or other types of rules received from service proxy manager 212. Furthermore, service proxy container 250 may enforce wireless network policies received from wireless network policies manager 220. Moreover, service proxy container 250 may report a set of metrics to telemetry engine 214. In some implementations, service proxy container 250 may function as, and/or implement the functions of, a Service Communication Proxy (SCP).

Although FIG. 2 shows exemplary components of service mesh system 160, in other implementations, service mesh system 160 may include fewer components, different components, differently arranged components, or additional components than depicted in FIG. 2. Additionally, or alternatively, one or more components of service mesh system 160 may perform functions described as being performed by one or more other components of service mesh system 160.

Figure 3:
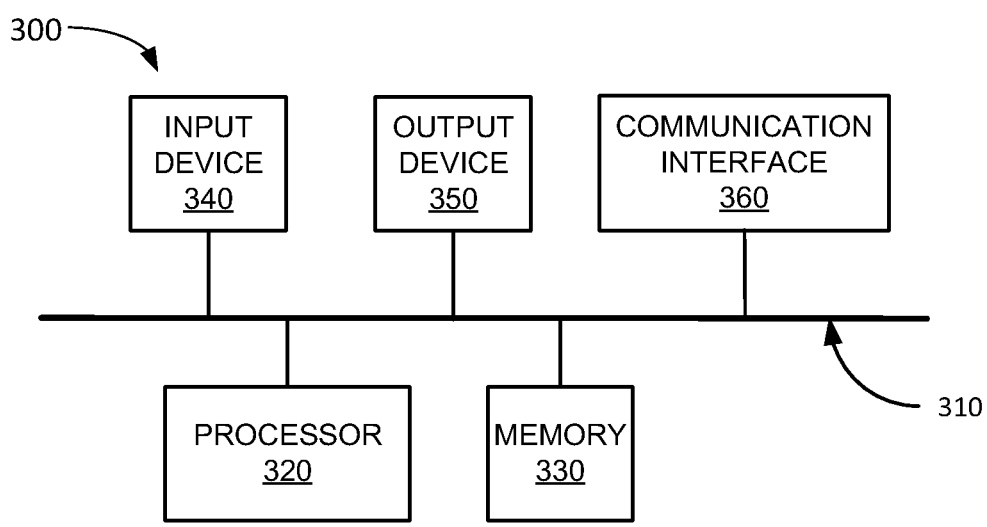
FIG. 3 illustrates exemplary components of device that may be included in the components of FIG. 1 or FIG. 2 according to an implementation described herein.

FIG. 3 is a diagram illustrating example components of a device 300 according to an implementation described herein. Base station 120, MEC device 145, service mesh system 160, orchestration system 170, mesh monitoring system 180, service mesh controller 210, container orchestration platform 230, and/or container node 240 may each include, or be implemented on, one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the operation of a wireless network policy manager in a service mesh and/or a mesh monitoring system. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
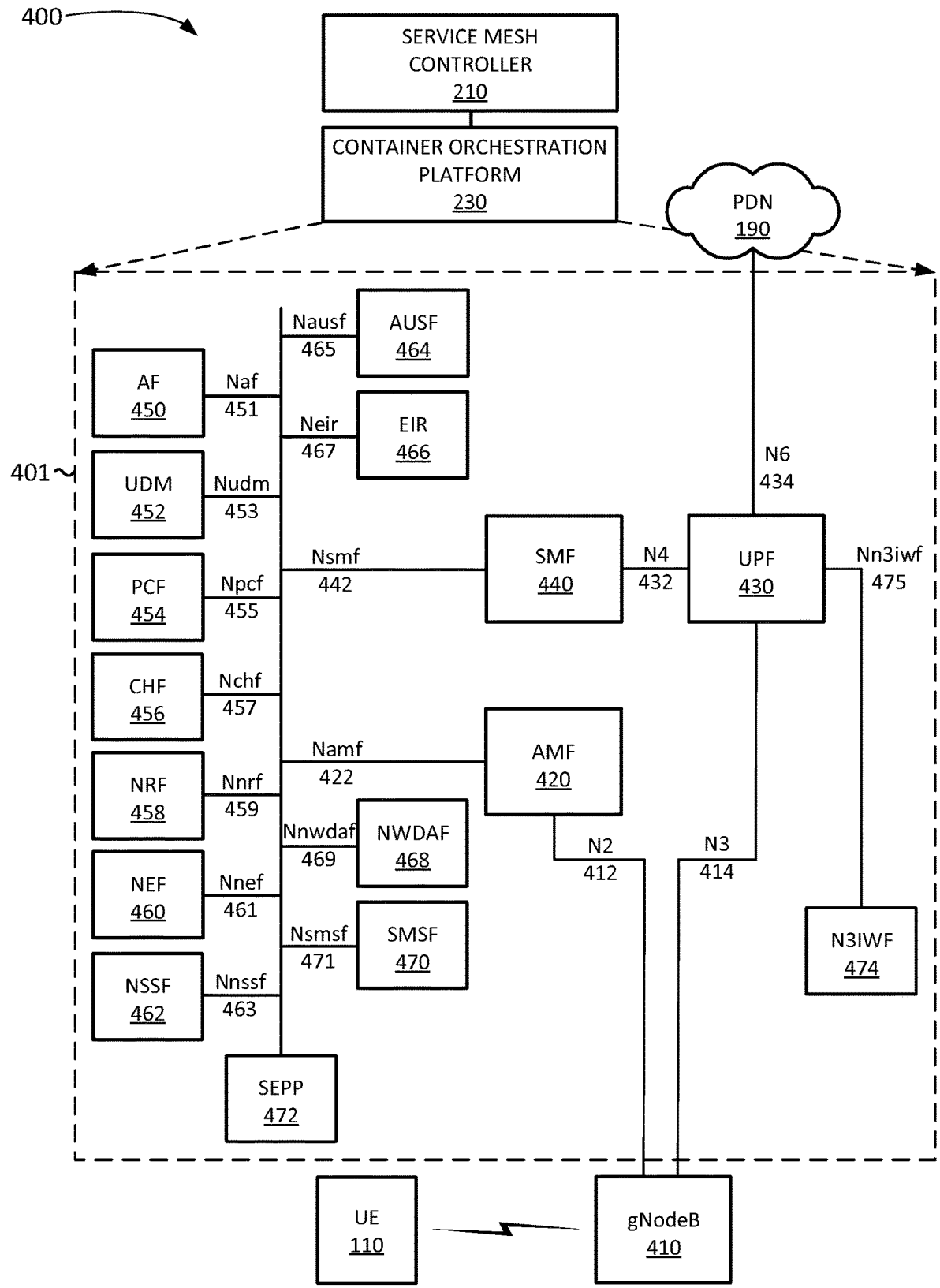
FIG. 4 illustrates exemplary components of the core network of FIG. 1 according to an implementation described herein.

FIG. 4 illustrates exemplary implementation 400 of components of core network 150 implemented in service mesh system 160. As shown in FIG. 4, implementation 400 may include service mesh controller 210, container orchestration platform 230, and core network NFs 401 deployed by container orchestration platform 230 in pods 246 on container nodes 240.

Core network NFs 401 may include an Access and Mobility Function (AMF) 420, a User Plane Function (UPF) 430, a Session Management Function (SMF) 440, an Application Function (AF) 450, a Unified Data Management (UDM) 452, a Policy Control Function (PCF) 454, a Charging Function (CHF) 456, a Network Repository Function (NRF) 458, a Network Exposure Function (NEF) 460, a Network Slice Selection Function (NSSF) 462, an Authentication Server Function (AUSF) 464, a 5G Equipment Identity Register (EIR) 466, a Network Data Analytics Function (NWDAF) 468, a Short Message Service Function (SMSF) 470, a Security Edge Protection Proxy (SEPP) 472, and a Non-3GPP Inter-Working Function (N3IWF) 474.

While FIG. 4 depicts a single AMF 420, UPF 430, SMF 440, AF 450, UDM 452, PCF 454, CHF 456, NRF 458, NEF 460, NSSF 462, AUSF 464, EIR 466, NWDAF 468, SMSF 470, SEPP 472, and N3IWF 474 for illustration purposes, in practice, core network NFs 401 may include multiple AMFs 420, UPFs 430, SMFs 440, AFs 450, UDMs 452, PCFs 454, CHFs 456, NRFs 458, NEFs 460, NSSFs 462, AUSFs 464, EIRs 466, NWDAFs 468, SMSFs 470, SEPPs 472, and/or N3IWFs 474.

Furthermore, while FIG. 4 illustrates gNodeB 410, corresponding to base station 120, as outside of core network NFs 401 implemented by container orchestration system 230, in other implementations, some functionality of gNodeB 410, such as the centralized unit (CU), may also be deployed by container orchestration system 230.

AMF 420 may perform registration management, connection management, reachability management, mobility management, lawful intercepts, Short Message Service (SMS) transport between UE device 110 and SMSF 470, session management messages transport between UE device 110 and SMF 440, access authentication and authorization, location services management, functionality to support non-3GPP access networks, and/or other types of management processes. AMF 420 may be accessible by other function nodes via an Namf interface 422.

UPF 430 may maintain an anchor point for intra/inter-RAT mobility, maintain an external Packet Data Unit (PDU) point of interconnect to a particular data network 140 (e.g., an IMS network, a MPN, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 410), and/or perform other types of user plane processes. UPF 430 may communicate with SMF 440 using an N4 interface 432 and connect to data network 140 using an N6 interface 434.

SMF 440 may perform session establishment, session modification, and/or session release, perform IP address allocation and management, perform Dynamic Host Configuration Protocol (DHCP) functions, perform selection and control of UPF 430, configure traffic steering at UPF 430 to guide the traffic to the correct destinations, terminate interfaces toward PCF 454, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 440 may be accessible via an Nsmf interface 442.

AF 450 may provide services associated with a particular application, such as, for example, an application for influencing traffic routing, an application for accessing NEF 460, an application for interacting with a policy framework for policy control, a third-party application running on server device 480 in a particular data network 140, and/or other types of applications. AF 450 may be accessible via an Naf interface 451, also referred to as an NG5 interface. For example, server device 480 may be configured to communicate with, or to function as, a particular AF 450 (shown as the dotted line connecting AF 450 and server device 480 in FIG. 4).

UDM 452 may maintain subscription information for UE devices 110, manage subscriptions, generate authentication credentials, handle user identification, perform access authorization based on subscription data, perform network function registration management, maintain service and/or session continuity by maintaining assignment of SMF 440 for ongoing sessions, support SMS delivery, support lawful intercept functionality, and/or perform other processes associated with managing user data. UDM 452 may store, in a subscription profile associated with a particular UE device 110, a list of network slices which the particular UE device 110 is allowed to access. UDM 452 may be accessible via a Nudm interface 453.

PCF 454 may support policies to control network behavior, provide policy rules to control plane functions (e.g., to SMF 440), access subscription information relevant to policy decisions, perform policy decisions, and/or perform other types of processes associated with policy enforcement. PCF 454 may be accessible via Npcf interface 455. CHF 456 may perform charging and/or billing functions for core network 150. CHF 456 may be accessible via Nchf interface 457.

NRF 458 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 458 may include one or more transport network Key Performance Indicators (KPIs) associated with the NF instance. NRF 458 may be accessible via an Nnrf interface 459.

NEF 460 may expose capabilities and events to other NFs, including third party NFs, AFs, edge computing NFs, and/or other types of NFs. Furthermore, NEF 460 may secure provisioning of information from external applications to core network 150, translate information between core network 150 and devices/networks external to core network 150, support a Packet Flow Description (PFD) function, and/or perform other types of network exposure functions. NEF 460 may include a slice manager that selects a network slice for a particular UE device 110 based on a request received from a particular AF 450, as described herein. NEF 460 may be accessible via Nnef interface 461.

NSSF 462 may select a set of network slice instances to serve a particular UE device 110, determine network slice selection assistance information (NSSAI), determine a particular AMF 420 to serve a particular UE device 110, and/or perform other types of processing associated with network slice selection or management. NSSF 462 may provide a list of allowed slices for a particular UE device 110 to UDM 452 to store in a subscription profile associated with the particular UE device 110. NSSF 462 may be accessible via Nnssf interface 463.

AUSF 464 may perform authentication. For example, AUSF 464 may implement an Extensible Authentication Protocol (EAP) authentication server and may store authentication keys for UE devices 110. AUSF 464 may be accessible via Nausf interface 465. EIR 466 may authenticate a particular UE device 110 based on UE device identity, such as a Permanent Equipment Identifier (PEI). For example, EIR 466 may check to determine if a PEI has been blacklisted. EIR 466 may be accessible via Neir interface 467.

NWDAF 468 may collect analytics information associated with radio access network 130 and/or core network 150. For example, NWDAF 468 may collect accessibility KPIs (e.g., an Radio Resource Control (RRC) setup success rate, a Radio Access Bearer (RAB) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 470 may perform SMS services for UE devices 110. SMSF 470 may be accessible via Nsmsf interface 471. SEPP 472 may implement application layer security for all layer information exchanged between two NFs across two different PLMNs. N3IWF 474 may interconnect to a non-3GPP access device, such as, for example, a WiFi access point (not shown in FIG. 4). N3IWF 474 may facilitate handovers for UE device 110 between radio access network 130 and the non-3GPP access device. N3IWF 474 maybe accessible via Nn3iwf interface 475.

Although FIG. 4 shows exemplary components of core network 150, in other implementations, core network 150 may include fewer components, different components, differently arranged components, or additional components than depicted in FIG. 4. Additionally, or alternatively, one or more components of core network 150 may perform functions described as being performed by one or more other components of core network 150. For example, core network 150 may include additional function nodes not shown in FIG. 4, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 4, additionally, or alternatively, core network 150 may include a reference point architecture that includes point-to-point interfaces between particular function nodes.

Furthermore, in other implementations, core network 150 may include a 4G core network and components of core network 150 implemented in service mesh system 160 may include one or more MMEs, SGWs, PGWs, HSSes, PCRFs, and/or other types 4G EPC nodes.

Figure 5:
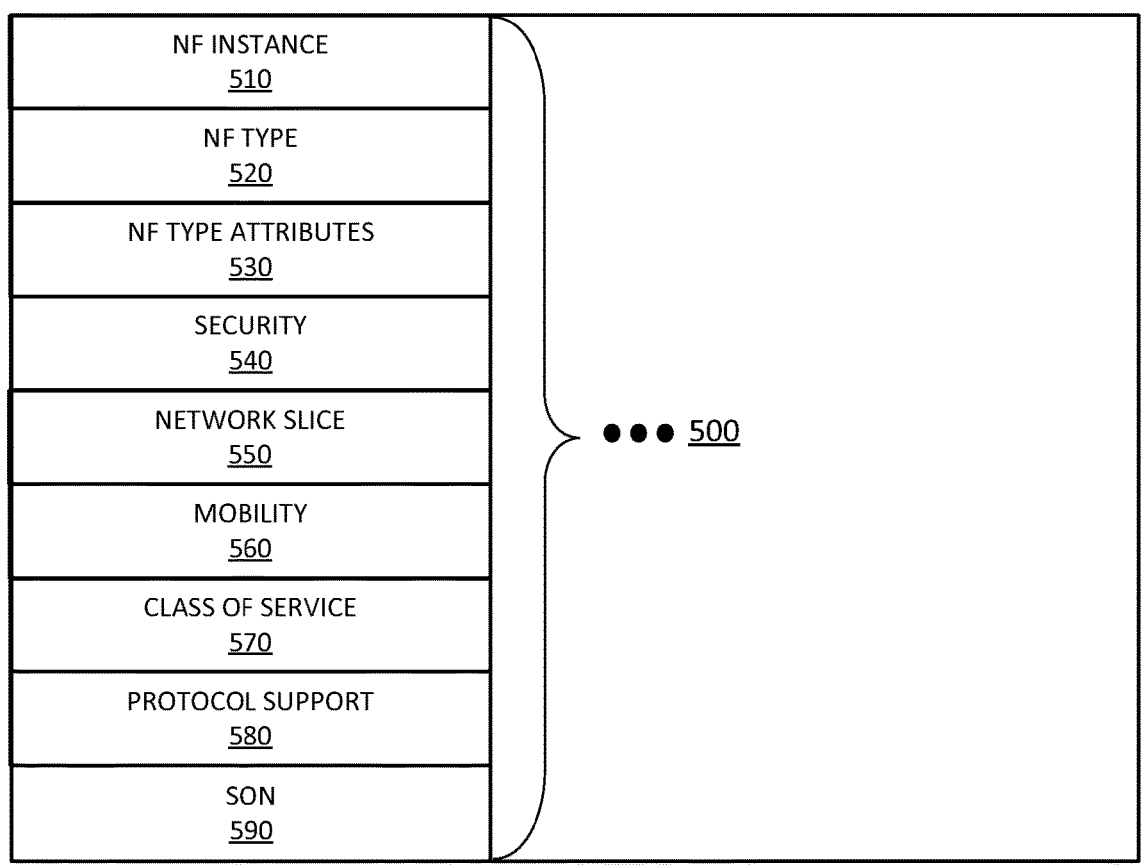
FIG. 5 illustrates exemplary components of the policy database of FIG. 2 according to an implementation described herein.

FIG. 5 illustrates exemplary components of policy DB 222. As shown in FIG. 5, policy DB 222 may include one or more network function records 500. Each network function record 500 may store policies associated with a particular network function. Network function record 500 may include an NF instance field 510, an NF type field 520, an NF type attributes field 530, a security field 540, a network slice field 550, a mobility field 560, a CoS field 570, a protocol support field 580, and a SON field 590.

NF instance field 510 may include information identifying a particular NF instance. For example, NF instance field 510 may identify a particular pod 246 and/or container node 240, and/or a group of pods 246, which includes the particular NF instance. NF type field 520 may identify a type of NF, and/or a particular microservice, associated with the particular NF instance.

NF type attributes field 530 may store one or more NF-specific attribute-value pairs associated with the particular NF instance. For example, if the particular NF instance corresponds to an NRF microservice, NF type attribute field 530 may store a heartbeat duration value, a validity period value, a logging level value, and/or another type of value.

Security field 540 may store one or more security policies associated with the particular NF instance. For example, security field 540 may include information identifying an authorized chain of trust, chain of trust detection policies, malware detection policies, denial of service attack detection policies, encryption policies, security posture information and policies, policies for flagging anomalous behavior, policies for detecting particular thresholds being exceeded, and/or other types of security policies.

Network slice field 550 may store one or more network slice policies associated with the particular NF instance, such as, for example, policies associated with a particular Network Slice Selection Assistance Information (NSSAI) value, a Slice/Service Type (SST) value, a Slice Differentiation (SD) value, and/or another type network slice identification value.

Mobility field 560 may store one or more mobility policies associated with the particular NF instance, such as, for example, values for an event handover parameter, a handover offset parameter, a handover hysteresis parameter, a handover time to trigger parameter, a neighbor list parameter, and/or another type of handover parameter.

CoS field 570 may store one or more CoS policies associated with the particular NF instance, such as, for example, policies associated with a particular Quality of Service (QoS), QoS Class Identifier (QCI), 5G QCI (5QI), Differentiated Services Code Point (DSCP), IEEE 802.1p CoS (dot1p), and/or another type of CoS, policies for mapping from one type of CoS value to another type of CoS value, and/or other types of CoS policies.

Protocol support field 580 may store one or more protocol support policies associated with the particular NF instance to ensure support for particular protocols, such as, for example, General Packet Radio Service (GPRS) Tunneling Protocol (GTP), Packet Data Convergence Protocol (PDCP), Non-Access Stratum (NAS) protocol, 5G-NAS protocol, Diameter protocol, Stream Control Transmission Protocol (SCTP), Hypertext Transfer Protocol (HTTP) 2.0, Transport Layer Security (TLS) protocol, and/or other protocols.

SON field 590 may store one or more SON policies associated with the particular NF instance, such as, for example, values for a self-configuration parameter, a self-optimization parameter, a self-healing parameter, and/or another type of SON parameter.

Although FIG. 5 shows exemplary components of policy DB 222, in other implementations, policy DB 222 may include fewer components, different components, additional components, or differently arranged components than depicted in FIG. 5.

Figure 6:
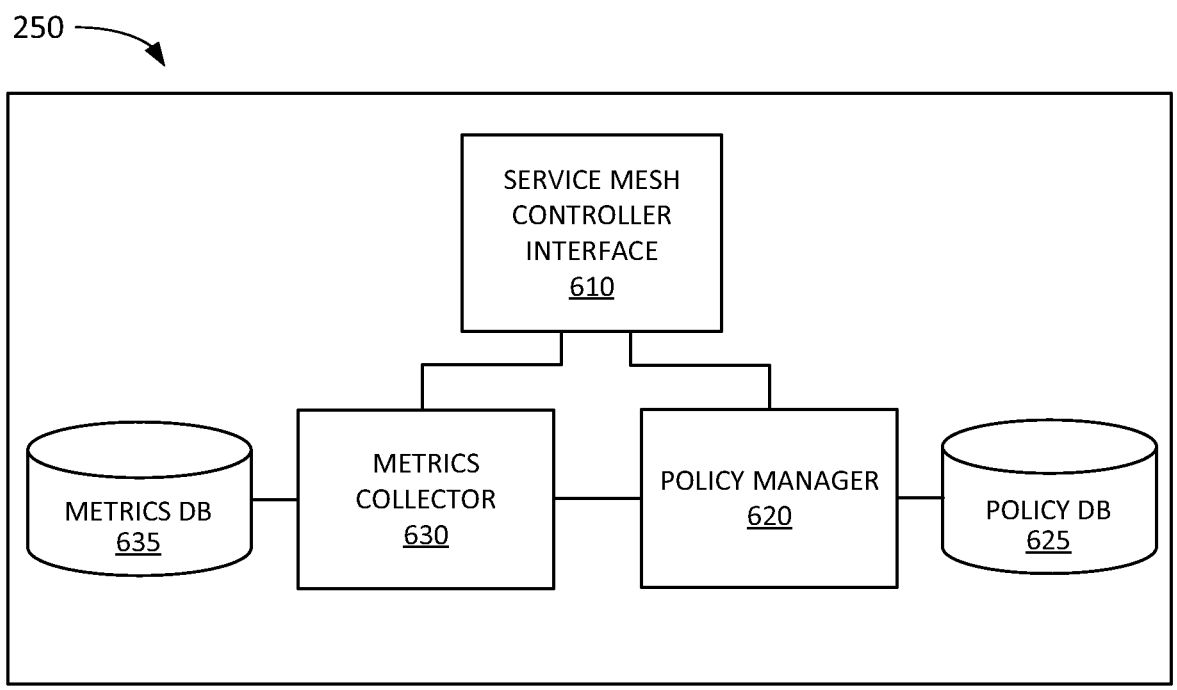
FIG. 6 illustrates exemplary components of the service proxy container of FIG. 2 according to an implementation described herein.

FIG. 6 illustrates exemplary components of service proxy container 250. The components of service proxy container 250 may be implemented, for example, via processor 320 executing instructions from memory 330. Alternatively, some or all of the components of service proxy container 250 may be implemented via hard-wired circuitry. As shown in FIG. 6, service proxy container 250 may include a service mesh controller interface 610, a policy manager 620, a policy DB 625, a metric collector 630, and a metrics DB 635.

Service mesh controller interface 610 may be configured to communicate with service mesh controller 210. For example, service mesh controller interface 610 may receive service rules to enforce from service proxy manager 212 and/or policies to apply from wireless network policies manager 220. Furthermore, service mesh controller interface 610 may send telemetry data to telemetry engine 214.

Policy manager 620 may receive policies from wireless network policies manager 220 via service mesh controller interface 610 and store the received policies in policy DB 625. Policy manager 620 may intercept traffic to and from network function container 248 and apply a set of policies to the intercepted traffic. For example, policy manager 620 may prioritize the intercepted traffic based on a CoS value, may block packets from being received by network function container 248 based on bit pattern identified by a security policy, may process packets associated with a particular communication protocol (e.g., add or remove a label, re-format a packet, etc.), may instruct metrics collector 630 to start collecting values for a particular metric, apply an NF-specific attribute to a message (e.g., add or remove an attribute-value pair, etc.), and/or perform another action associated with a policy stored in policy DB 625. Metrics collector 630 may collect values for a set of metrics, store the collected metrics values in metrics DB 635, and report the stored metrics value to telemetry engine 214 via service mesh controller interface 610 at particular intervals.

Although FIG. 6 shows exemplary components of service proxy container 250, in other implementations, service proxy container 250 may include fewer components, different components, differently arranged components, or additional components than depicted in FIG. 6.

Figure 7:
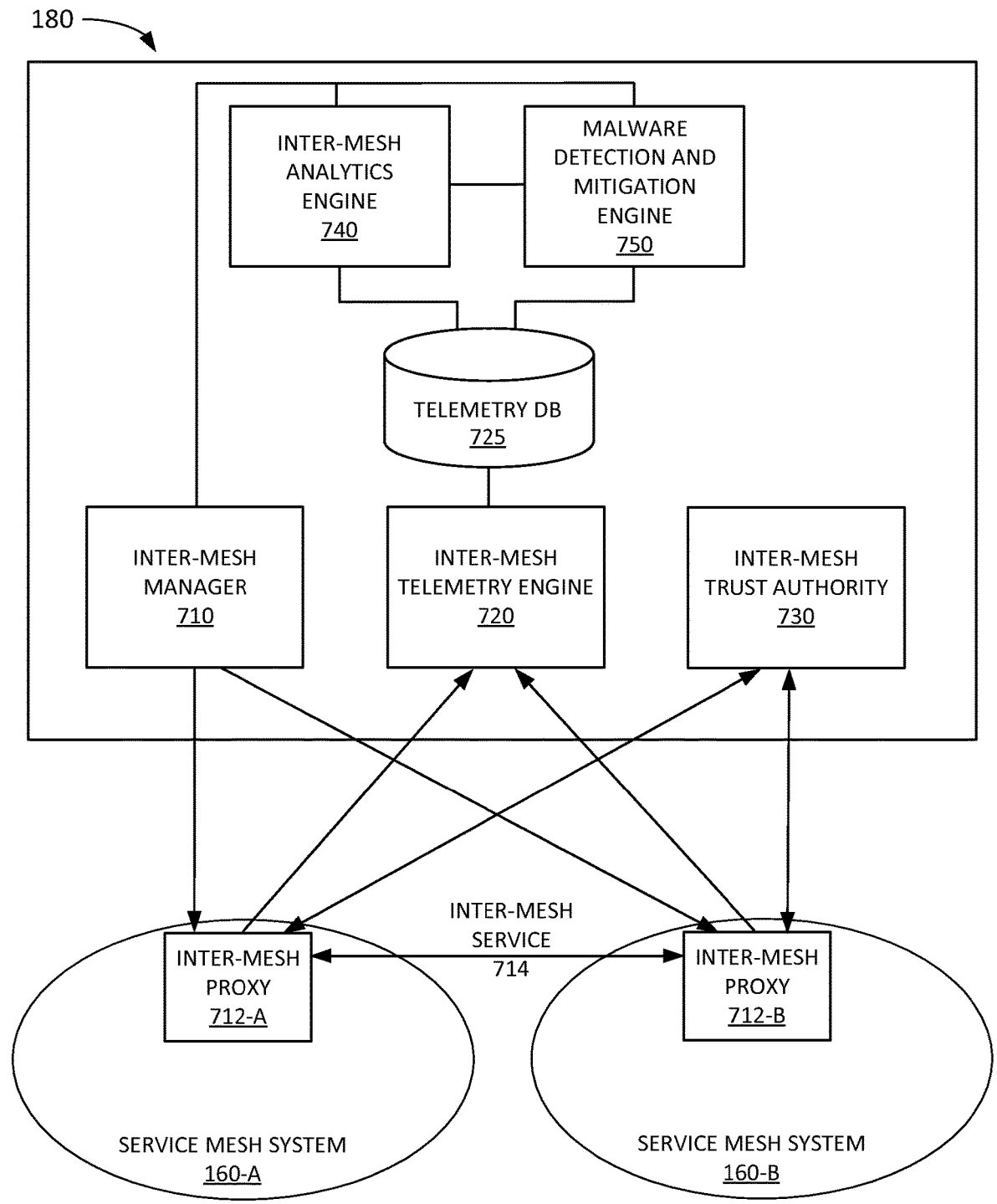
FIG. 7 illustrates exemplary components of the mesh monitoring system of FIG. 1 according to an implementation described herein.

FIG. 7 illustrates exemplary components of mesh monitoring system 180. The components of mesh monitoring system 180 may be implemented, for example, via processor 320 executing instructions from memory 330. Alternatively, some or all of the components of mesh monitoring system 180 may be implemented via hard-wired circuitry. As shown in FIG. 7, mesh monitoring system 180 may include an inter-mesh manager 710, an inter-mesh telemetry engine 720, a telemetry DB 725, an inter-mesh trust authority 730, an inter-mesh analytics engine 740, and a malware detection and mitigation engine 750.

Inter-mesh manager 710 may manage the connectivity between different service mesh systems 160. Inter-mesh manager 710 may provide an inter-mesh proxy 712 to service mesh controller 210 of each service mesh system 160. Additionally, or alternatively, inter-mesh proxy 712 may be implemented as part of service proxy container 250 or in a separate container in pod 246. Inter-mesh manager 710 may configure load balancing, routing rules, resiliency rules, and/or policies between service mesh systems 160 via inter-mesh proxy 712. Inter-mesh proxy 712 may provide an inter-mesh service 714 between service mesh system 160-A (via inter-mesh proxy 712-A) and service mesh system 160-B (via inter-mesh proxy 712-B). For example, service mesh system 160-A and service mesh system 160-B may be associated with different geographic regions, different network slices (e.g., an IoT network slice, an enhanced mobility network slice, an URLLC network slice, etc.), different wireless communication networks, different providers of wireless communication services, different enterprises, etc.

Inter-mesh telemetry engine 720 may collect telemetry data associated with particular service mesh systems 160 and collected by inter-mesh proxy 712 and store the collected telemetry data in telemetry DB 725. The telemetry data may include metrics such as, for example, metrics described above with respect to telemetry engine 214. Inter-mesh trust authority 730 may manage keys and certificates between service mesh systems 160. For example, the keys and certificates may be used to establish encrypted communication channels between service mesh systems 160 and/or establish a chain of trust between different service mesh systems 160.

Inter-mesh analytics engine 740 may analyze metrics obtained by inter-mesh telemetry engine 720 and stored in telemetry DB 725. Inter-mesh analytics engine 740 may track data between service mesh systems 160 and correlate patterns across service mesh systems 160 to determine patterns that may be used to optimize communication between service mesh systems 160 and/or to identify security threats. For example, inter-mesh analytics engine 740 may load balance traffic between service mesh systems 160 through particular routes to reduce congestion, improve latency, increase packet delivery rates, etc.

Malware detection and mitigation engine 750 may perform malware detection and/or using the data collected and stored in telemetry DB 725 and/or using patterns identified by inter-mesh analytics engine 740. Inter-mesh analytics engine 740 and/or malware detection and mitigation engine 750 may each include a trained deep learning neural network, or another type of machine learning (ML) model, such as, for example, a Support Vector Machine (SVM) classifier, a K-nearest neighbors (KNN) classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc. In some implementations, the ML model(s) may be trained with supervised earning using labeled training sets of previously identified patterns and/or security threats. In other implementations, the ML model(s) may be trained with unsupervised learning.

Malware detection and mitigation engine 750 may update a security policy based on detected malware and/or other types of security threats. For example, malware detection and mitigation engine 750 may identify a new data pattern as a security threat and update a blacklist security policy to block packets that include the identified security threat from being sent using inter-mesh service 714. As another example, malware detection and mitigation engine 750 may determine that a particular service mesh system 160 has exceeded a threshold (e.g., that the number of TCP connection in the particular service mesh system 160 has exceeded a threshold) and may isolate particular types of traffic from the particular service mesh system 160 to other service mesh systems 160. As another example, the ML model(s) used by malware detection and mitigation engine 750 may be trained to detect anomalies and used to detect zero-day attacks. Thus, malware detection and mitigation engine 750 may implement a global security policy that functions as a global security mesh for service mesh systems 160. Furthermore, a global security policy may be applied during deployment of new pods 246 by intercepting instructions from orchestration system 170 and applying a security policy to newly deployed NF containers 248 and/or service proxy containers 250. Based on the threat and associated risk, the policies applied to the different service meshes may be tailored to a particular service mesh and, therefore, policies applied using inter-mesh proxy 712-A in order to mitigate threats against service mesh system 160-A may be different from policies applied using inter-mesh proxy 712-B to service mesh system 160-B.

Although FIG. 7 shows exemplary components of mesh monitoring system 180, in other implementations, mesh monitoring system 180 may include fewer components, different components, differently arranged components, or additional components than depicted in FIG. 7.

Figure 8:
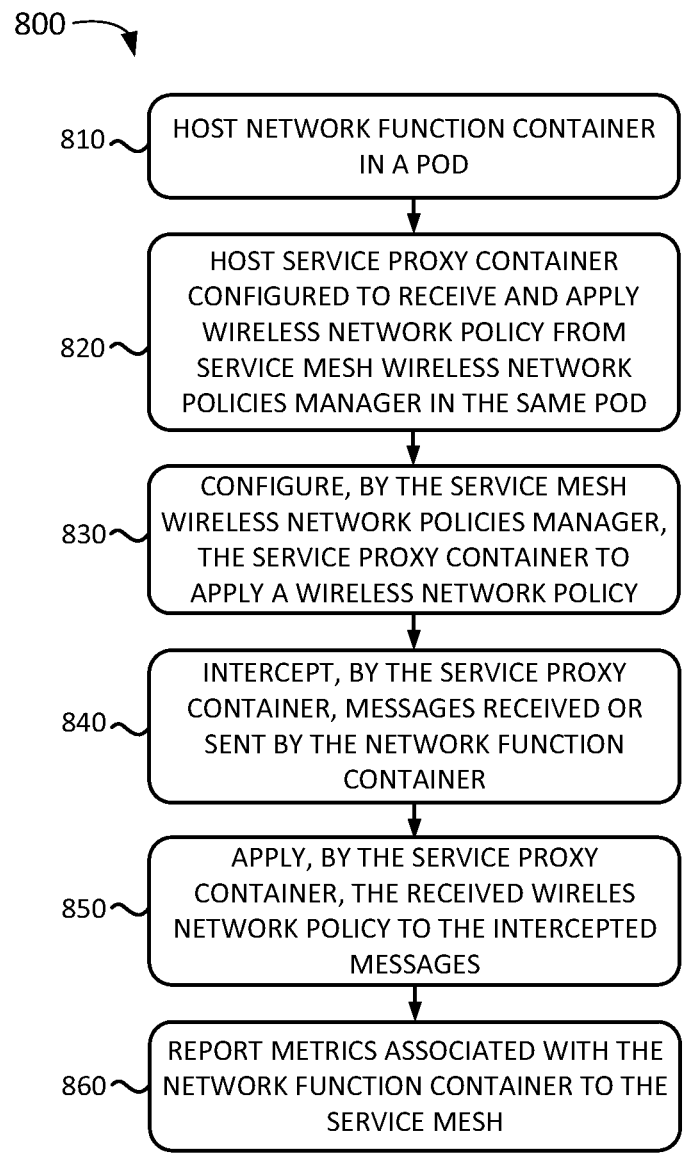
FIG. 8 illustrates a flowchart of a process for configuring and using a service proxy container according to an implementation described herein.

FIG. 8 illustrates a flowchart of a process for configuring and using a service proxy container according to an implementation described herein. In some implementations, process 800 of FIG. 8 may be performed by service mesh system 160. In other implementations, some or all of process 800 may be performed by another device or a group of devices separate from service mesh system 160.

As shown in FIG. 8, process 800 may include hosting a pod that includes a network function container (block 810) and hosting a service proxy container in the same pod, which is configured to receive and apply a wireless network policy from a service mesh wireless network policies manager (block 820).

For example, orchestration system 170 may instruct service mesh system 160 to generate, implement, and/or host a new instance of an NF type (e.g., an NRF instance). In response, content orchestration platform 230 may deploy a set of new pods 246 in one or more container nodes 240 based on an established configuration that includes a first pod 246-A with a first NF container 248-A for an NRF registration microservice, a second pod 246-B with a second NF container 248-B for an NRF discovery microservice, and a third pod 246-C with a third NF container 248-C for an NRF subscription microservice. Furthermore, service mesh controller 210 may instruct container orchestration platform 230 to inject a first service proxy container 250-A into first pod 246-A, a second first service proxy container 250-B into second pod 246-B, and a third service proxy container 250-C into third pod 246-C.

Process 800 may further include configuring, by the service mesh wireless network policies manager, the service proxy container to apply a wireless network policy (block 830). For example, wireless network policies manager 220 may select a set of policies, such as a set of NF attribute values, a CoS policy, a security policy, a network slice policy, a mobility policy, a protocol support policy, a SON policy, a MEC policy, and/or another type of policy and may instruct each of service proxy containers 250-A, 250-B, and/or 250-C to implement a selected set of policies for NF containers 248-A, 248-B, and 248-C, respectively.

Process 800 may further include intercepting, by the service proxy container, messages received or sent by the NF container (block 840) and applying the received wireless network policy to the intercepted messages (block 850). For example, service proxy container 250 may prioritize the intercepted traffic based on a CoS value, may block packets from being received by network function container 248 based on bit pattern identified by a security policy, may process packets associated with a particular communication protocol (e.g., add or remove a label, re-format a packet, etc.), may instruct metrics collector 630 to start collecting values for a particular metric, apply an NF-specific attribute to a message (e.g., add or remove an attribute-value pair, etc.), and/or perform another action associated with a wireless network policy received from wireless network policies manager 220.

Process 800 may further include reporting metrics associated with the network function container to the service mesh (block 860). For example, service proxy container 250 may collect values for a set of metrics based on a metrics collection policy received from wireless network policies manager 220 and send the collected metrics values to telemetry engine 214.

Figure 9:
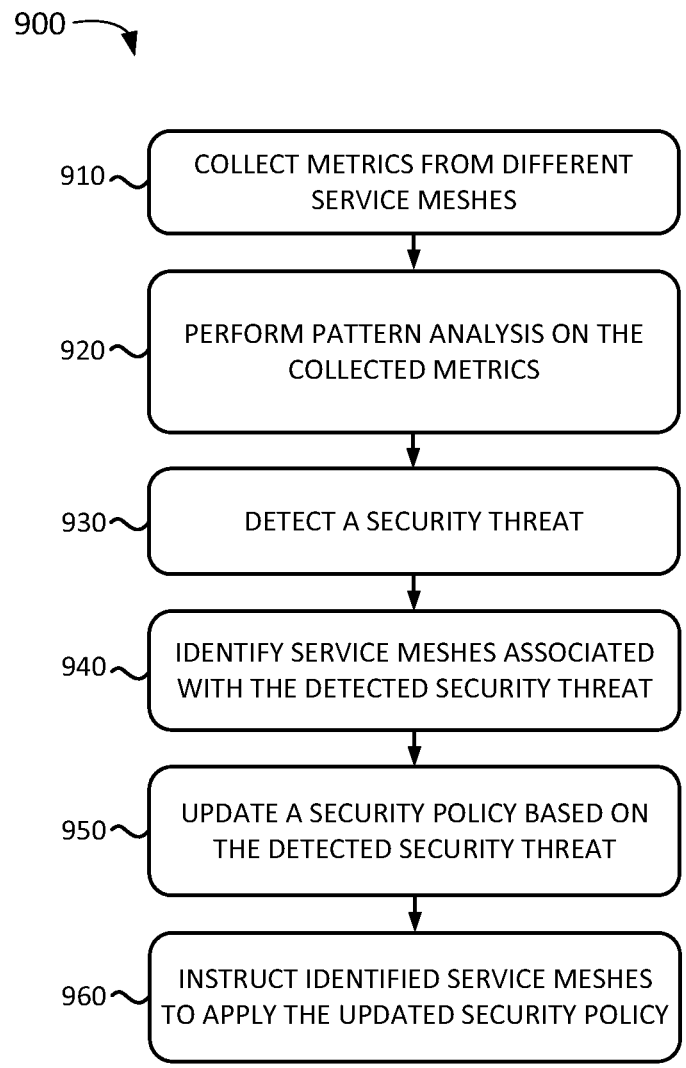
FIG. 9 illustrates a flowchart of a process for monitoring service meshes according to an implementation described herein.

FIG. 9 illustrates a flowchart of a process for monitoring service meshes according to an implementation described herein. In some implementations, process 900 of FIG. 9 may be performed by mesh monitoring system 180. In other implementations, some or all of process 900 may be performed by another device or a group of devices separate from mesh monitoring system 180, such as, for example, service mesh system 160.

As shown in FIG. 9, process 900 may include collecting metrics from different service meshes (block 910). For example, inter-mesh telemetry engine 720 may collect telemetry data associated with particular service mesh systems 160 and collected by inter-mesh proxy 712, such as, for example transport network metrics, and store the collected telemetry data in telemetry DB 725. Process 900 may further include performing pattern analysis on the collected metrics (block 920) and detecting a security threat (block 930). For example, malware detection and mitigation engine 750 may use a trained ML model to identify a pattern associated with suspicious behavior, such as, for example, a new data pattern associated with a number of TCP connection requests that exceed a threshold.

Process 900 may further include identifying service meshes associated with the detected security threat (block 940), updating a security policy based on the detected security threat (block 950), and instructing the identified service meshes to apply the updated security policy (block 960). As an example, malware detection and mitigation engine 750 may update a blacklist security policy to block packets that include the identified security threat from being sent using inter-mesh service 714. As another example, malware detection and mitigation engine 750 may select or isolate particular types of traffic from the particular service mesh system 160 to other service mesh systems 160. In response, inter-mesh manager 710 may instruct, via inter-mesh proxy 712, service mesh controller 210 to apply the updated security policy to traffic in the service mesh and/or to traffic to or from the service mesh to another service mesh.

Figure 10:
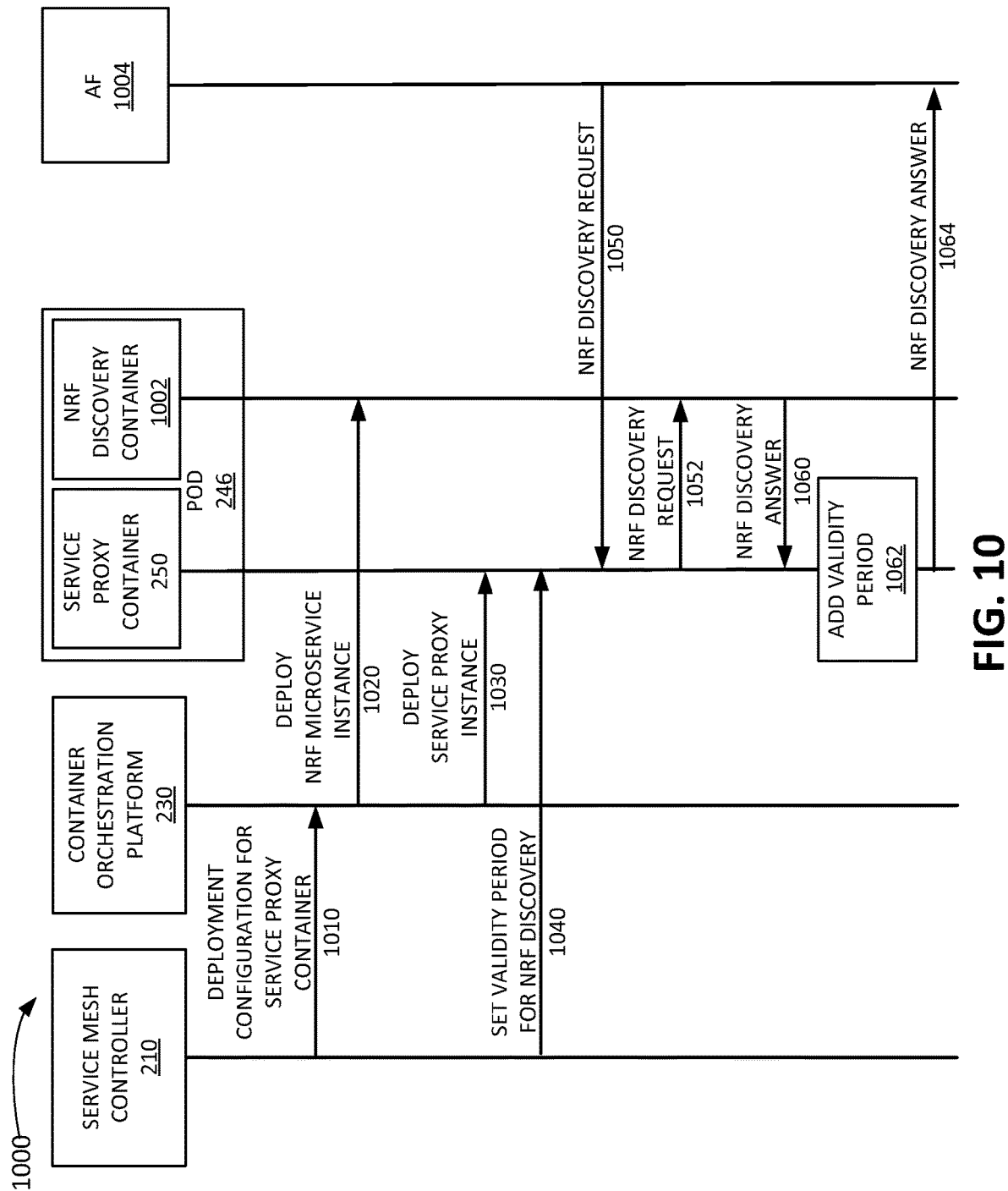
FIG. 10 illustrates a first exemplary signal flow according to an implementation described herein.

FIG. 10 illustrates a first exemplary signal flow 1000 according to an implementation described herein. As shown in FIG. 10, signal flow 1000 may include service mesh controller 210 providing a configuration for deployment of service proxy container 250 to container orchestration platform 230 (signal 1010). Container orchestration platform 230 may, in response to an instruction from orchestration system 170 (not shown in FIG. 10), deploy pod 246 that includes an instance of an NRF discovery microservice in an NRF discovery container 1002 (signal 1020) and an instance of service proxy container 250 (signal 1030). Service mesh controller 210 may then apply an NRF policy to service proxy container 250 by setting a validity period for which a discovery request is valid (signal 1040).

After pod 246 is deployed, AF 1004 may send an NRF discovery request to discover NFs of a particular type in core network 150 (signal 1050). For example, AF 1004 may seek to discover available instances of NEF 460. Service proxy container 250 may intercept the NRF discovery request and forward the NRF discovery request to NRF discovery container 1002 (signal 1052). NRF discovery container 1002 may generate an NRF discovery answer that includes information identifying available instances of NEF 460 (signal 1060). Service proxy container 250 may intercept the NRF discover answer and may add a validity period value for which the NRF discovery answer is valid based on the value received from service mesh controller 210 (block 1062) and may send the modified NRF discovery answer to AF 1004 (signal 1064).

Figure 11:
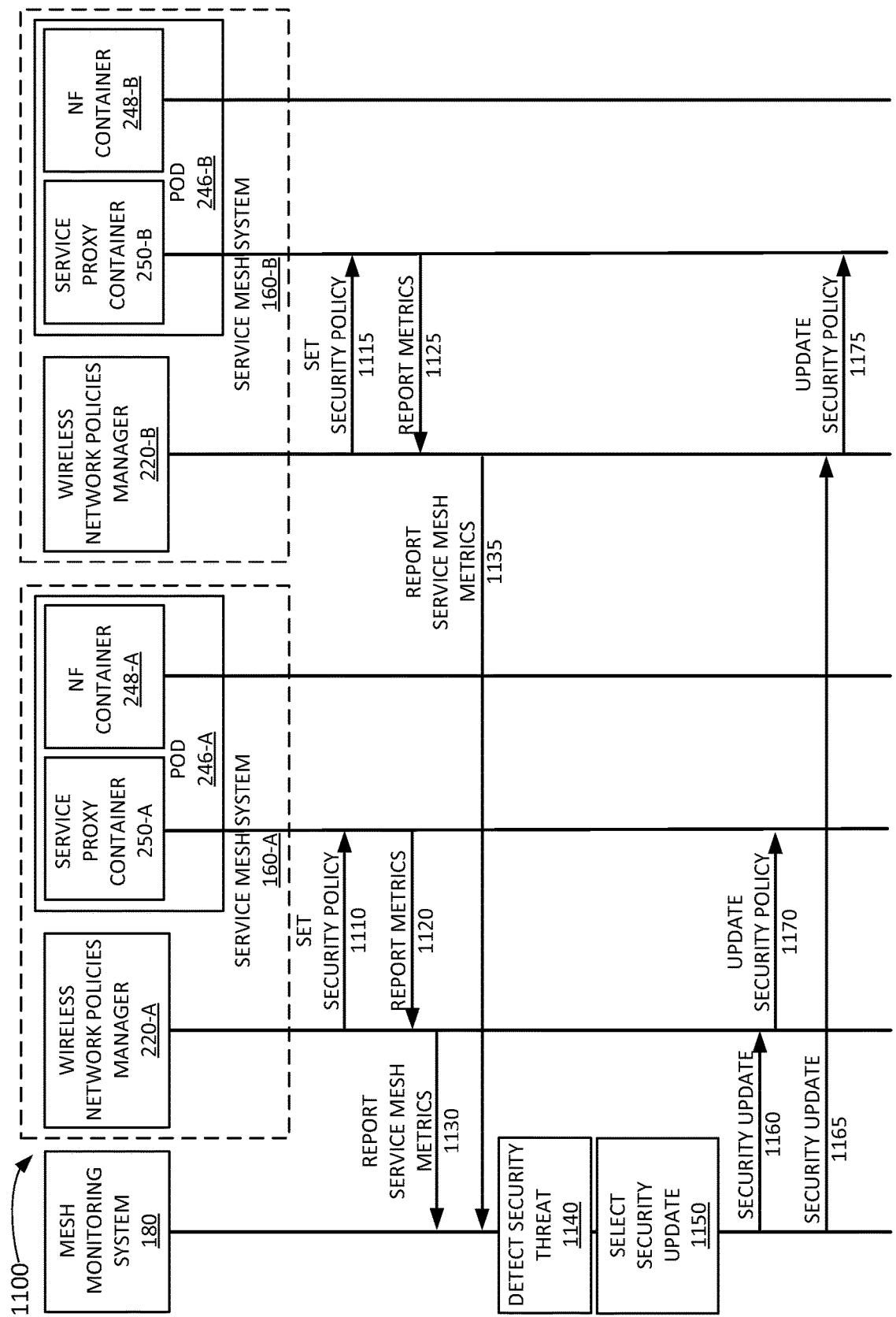
FIG. 11 illustrates a second exemplary signal flow according to an implementation described herein.

FIG. 11 illustrates a second exemplary signal flow 1100 according to an implementation described herein. As shown in FIG. 11, signal flow 1100 may include wireless network policies manager 220-A setting a security policy in service mesh system 160-A (signal 1110). The security policy may include instructions to service proxy container 250-A to report a set of transport network metrics to wireless network policies manager 220-A (signal 1120). Wireless network policies manager 220-A may in turn report the received metrics to mesh monitoring system 180 (signal 1130).

Similarly, wireless network policies manager 220-B may set a security policy in service mesh system 160-B (signal 1115). The security policy may include instructions to service proxy container 250-B to report a set of transport network metrics to wireless network policies manager 220-B (signal 1125). Wireless network policies manager 220-B may in turn report the received metrics to mesh monitoring system 180 (signal 1135).

Mesh monitoring system 180 may analyze the reported metric values to detect a security threat and select a security update (blocks 1140 and 1150). For example, mesh monitoring system 180 may determine that, during a time period, while the number of TCP connection requests in service mesh system 160-A alone, or in service mesh system 160-B alone do not exceed a threshold, when taken together, the number of TCP connection requests together in both service mesh system 160-A and service mesh system 160-B do exceed a threshold. Mesh monitoring system 180 may then identify a source address, and/or a data pattern, associated with the high number of TCP connection requests, and may add the source address and/or data pattern to a blacklist in the security policy. Mesh monitoring system 180 then may send an updated security policy to wireless network policies manager 220-A (signal 1160) and to wireless network policies manager 220-B (signal 1165). Wireless network policies manager 220-A may then update the security policy in service proxy container 250-A (signal 1170) and wireless network policies manager 220-B may then update the security policy in service proxy container 250-B (signal 1175).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8 and 9, and a series of signals have been described with respect to FIGS. 10 and 11, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  hosting, by a computer device, a network function container that implements a microservice for a network function in a wireless communications network, wherein the network function container is deployed by a container orchestration platform;

hosting, by the computer device, a service proxy container associated with the network function container, wherein the service proxy container is deployed by the container orchestration platform;

configuring, by the computer device, the hosted service proxy container to apply a wireless network policy to the microservice for the network function;

intercepting, by the computer device, messages associated with the microservice for the network function using the configured service proxy container;

applying, by the computer device, the wireless network policy to the intercepted messages using the configured service proxy container;

collecting, by the computer device, values for a plurality of metrics from a plurality of service meshes;

detecting, by the computer device, a security threat based on the collected values;

updating, by the computer device, a security policy based on the detected security threat; and instructing, by the computer device, at least one of the plurality of service meshes to apply the updated security policy to network functions associated with the at least one of the plurality of service meshes.

2. The method of claim 1, wherein the network function container is part of a service mesh of a plurality of nodes deployed by the container orchestration platform, and wherein the network function container and the service proxy container are included in a same pod in a node of the plurality of nodes.

3. The method of claim 2, wherein the computer device includes a wireless network policies manager, and wherein the wireless network policies manager is associated with a service mesh controller that controls the service mesh of the plurality of nodes.

4. The method of claim 1, wherein the wireless network policy further includes at least one of a security policy, a policy to collect values for a particular metric, a policy to support a particular protocol, or a policy associated with at least one of a Quality of Service (QoS) class, a handover parameter, a network slice, a Self-Optimizing Network (SON), or edge computing.

5. The method of claim 1, wherein the wireless network policy includes a policy to set an attribute of the network function.

6. The method of claim 1, further comprising:
configuring the hosted service proxy container to collect values for a metric associated with the network function.

7. The method of claim 1, wherein the network function includes at least one of an Access and Mobility Function (AMF), a Session Management Function (SMF), a User Plane Function (UPF), an Application Function (AF), a Unified Data Management (UDM) function, a Policy Control Function (PCF), a Charging Function (CHF), a Network Repository Function (NRF), a Network Exposure Function (NEF), a Network Slice Selection Function (NSSF), or a gNodeB function.

8. The method of claim 1, wherein the network function includes at least one of a Mobility Management Entity (MME), a Home Subscriber Server (HSS), a Policy and Charging Rules Function (PCRF), a Serving Gateway (SGW), or a Packet Data Network Gateway (PGW).

9. The method of claim 1, wherein detecting the security threat based on the collected values includes:

using a machine learning model trained to detect security threats in a wireless communications network.

10. The method of claim 1, wherein different ones of the plurality of service meshes are at least one of located in different geographic locations, associated with different providers of wireless communications networks, or associated with different enterprises.

11. A computer device comprising:
a memory storing instructions; and
a processor configured to execute the instructions to:
host a network function container that implements a microservice for a network function in a wireless communications network, wherein the network function container is deployed by a container orchestration platform;
host a service proxy container associated with the network function container, wherein the service proxy container is deployed by the container orchestration platform;
configure the hosted service proxy container to apply a wireless network policy to the microservice for the network function;
intercept messages associated with the microservice for the network function using the configured service proxy container; and
apply the wireless network policy to the intercepted messages using the configured service proxy container;
collect values for a plurality of metrics from a plurality of service meshes;
detect a security threat based on the collected values;
update a security policy based on the detected security threat; and
instruct at least one of the plurality of service meshes to apply the updated security policy to network functions associated with the at least one of the plurality of service meshes.

12. The computer device of claim 11, wherein the network function container is part of a service mesh of a plurality of nodes deployed by the container orchestration platform, and wherein the network function container and the service proxy container are included in a same pod in a node of the plurality of nodes.

13. The computer device of claim 12, wherein the computer device includes a wireless network policies manager, and wherein the wireless network policies manager is associated with a service mesh controller that controls the service mesh of the plurality of nodes.

14. The computer device of claim 11, wherein the wireless network policy further includes at least one of a security policy, a policy to collect values for a particular metric, a policy to support a particular protocol, a policy to set an attribute of the network function, or a policy associated with at least one of a Quality of Service (QoS) class, a handover parameter, a network slice, a Self-Optimizing Network (SON), or edge computing.

15. The computer device of claim 11, wherein the processor is further configured to:
configure the hosted service proxy container to collect values for a metric associated with the network function.

16. The computer device of claim 11, wherein the network function includes at least one of an Access and Mobility Function (AMF), a Session Management Function (SMF), a User Plane Function (UPF), an Application Function (AF), a Unified Data Management (UDM) function, a Policy Control Function (PCF), a Charging Function (CHF), a Network Repository Function (NRF), a Network Exposure Function (NEF), a Network Slice Selection Function (NSSF), or a gNodeB function.

17. The computer device of claim 11, wherein the network function includes at least one of a Mobility Management Entity (MME), a Home Subscriber Server (HSS), a Policy and Charging Rules Function (PCRF), a Serving Gateway (SGW), or a Packet Data Network Gateway (PGW).

18. A system comprising:
   a first computer device configured to:
      implement a network function container that implements a microservice for a network function in a wireless communications network, wherein the network function container is deployed by a container orchestration platform; and
      implement a service proxy container associated with the network function container, wherein the service proxy container is deployed by the container orchestration platform;
   a second computer device configured to:
      configure the implemented service proxy container to apply a wireless network policy to the microservice for the network function, wherein the wireless network policy includes a policy associated with at least one of a Quality of Service (QoS) class, a handover parameter, a network slice, a Self-Optimizing Network (SON), or edge computing;
   wherein the first computer device is further configured to:
      intercept messages associated with the microservice for the network function using the configured service proxy container;
      apply the wireless network policy to the intercepted messages using the configured service proxy container;
      collect values for a plurality of metrics from a plurality of service meshes;
      detect a security threat based on the collected values;
      update a security policy based on the detected security threat; and
      instruct at least one of the plurality of service meshes to apply the updated security policy to network functions associated with the at least one of the plurality of service meshes.

19. The system of claim 18, wherein, when detecting the security threat based on the collected values, the first computer device is further configured to:
   use a machine learning model trained to detect security threats in a wireless communications network.

20. The system of claim 18, wherein different ones of the plurality of service meshes are at least one of located in different geographic locations, associated with different providers of wireless communications networks, or associated with different enterprises.

* * * * *